(12) United States Patent
Foster et al.

(10) Patent No.: US 7,356,147 B2
(45) Date of Patent: Apr. 8, 2008

(54) METHOD, SYSTEM AND PROGRAM PRODUCT FOR ATTACHING A TITLE KEY TO ENCRYPTED CONTENT FOR SYNCHRONIZED TRANSMISSION TO A RECIPIENT

(75) Inventors: Eric M. Foster, Owego, NY (US); Jeffrey B. Lotspiech, San Jose, CA (US); Florian Pestoni, Mountain View, CA (US); Wilfred E. Plouffe, Jr., San Jose, CA (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1475 days.

(21) Appl. No.: 10/124,873

(22) Filed: Apr. 18, 2002

(65) Prior Publication Data

US 2003/0200176 A1    Oct. 23, 2003

(51) Int. Cl.
*H04K 1/00*     (2006.01)
*H04L 9/00*     (2006.01)

(52) U.S. Cl. .................... 380/281; 380/267; 380/277; 380/278; 713/160

(58) Field of Classification Search ............... 380/281, 380/267
See application file for complete search history.

(56) References Cited

U.S. PATENT DOCUMENTS 5,420,866 A * 5/1995 Wasilewski .................. 370/426
5,499,298 A * 3/1996 Narasimhalu et al. ........ 705/54
6,073,122 A * 6/2000 Wool ........................... 705/51
RE37,052 E    2/2001 Park
2001/0018743 A1  8/2001 Morishita
2001/0053979 A1  12/2001 Kori

FOREIGN PATENT DOCUMENTS

| EP | 0720328 B1 | 12/2003 |
| JP | 07077933 A2 | 3/1995 |
| JP | 2001086110 A2 | 3/2001 |
| JP | 2001211229 A2 | 8/2001 |
| TW | 381246 | 2/2000 |

OTHER PUBLICATIONS

Bruce Schneier, "Applied Cryptography", copyright 1996, John Wiley & Sons Inc., second edition, pp. 178-180.*
IBM Technical Disclosure Bulletin, vol. 33, No. 3A, Dated: Aug. 1990, "In-Band Delivery Of Scrambling Keys In Fixed Format Data".

* cited by examiner

*Primary Examiner*—Kim Vu
*Assistant Examiner*—Ponnoreay Pich
(74) *Attorney, Agent, or Firm*—Kerry B. Goodwin; Hoffman, Warnick & D'Alessandro LLC

(57) ABSTRACT

A method and system for attaching a title key to encrypted content for synchronized transmission to, or storage by, a recipient is provided. Specifically, under the present invention, an elementary media stream is parceled into content units that each include a content packet and a header. The content packets are encrypted with one or more title keys. Once the content packets have been encrypted, the title keys are themselves encrypted with a key encrypting key. The encrypted title keys are then attached to the corresponding encrypted content packets for synchronized transmission to a recipient.

7 Claims, 12 Drawing Sheets

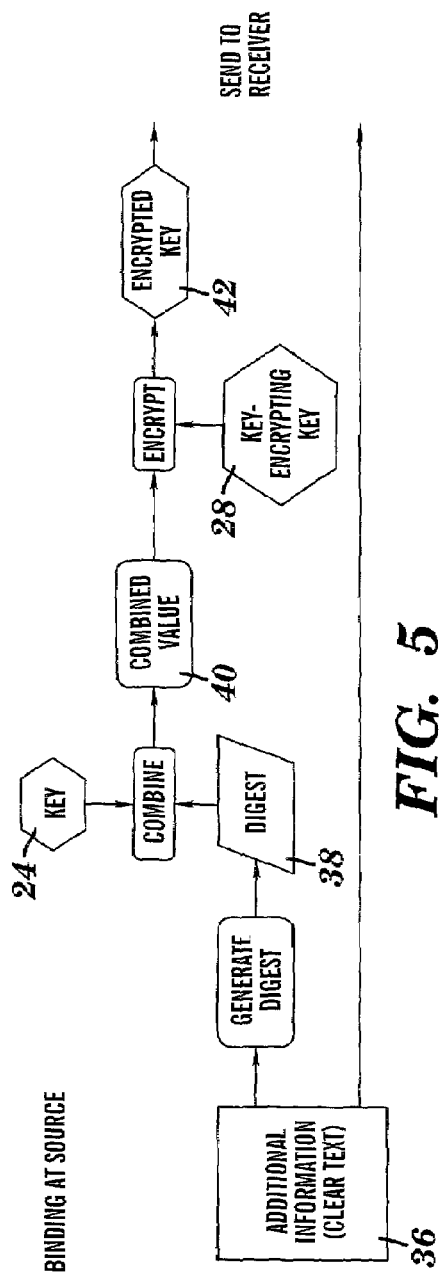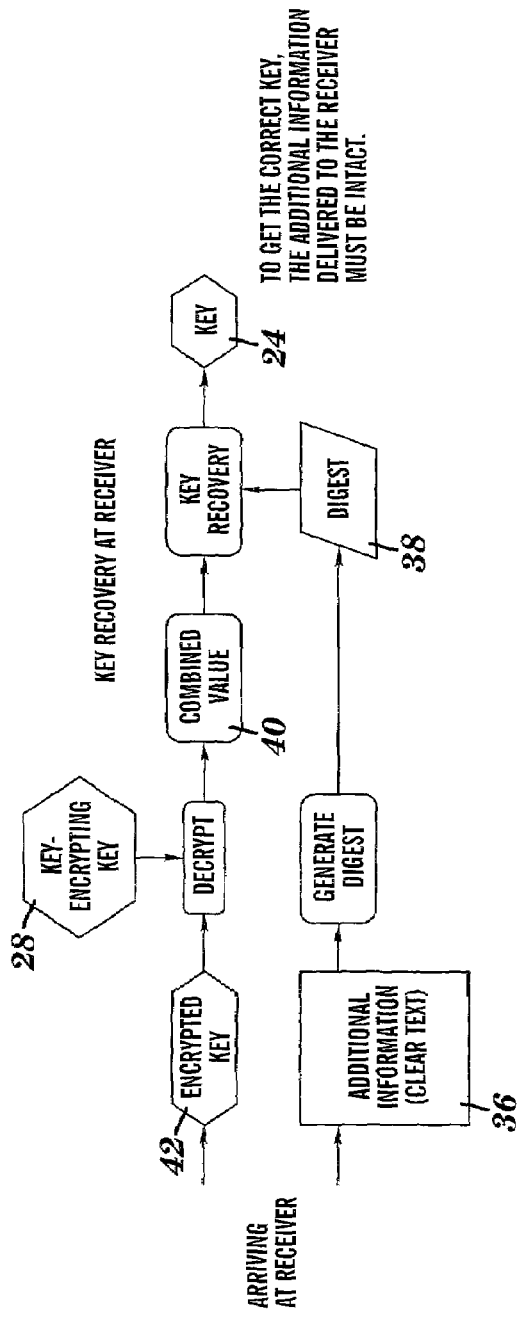

METHOD, SYSTEM AND PROGRAM PRODUCT FOR ATTACHING A TITLE KEY TO ENCRYPTED CONTENT FOR SYNCHRONIZED TRANSMISSION TO A RECIPIENT

BACKGROUND OF THE INVENTION

1. Field of the Invention

The present invention generally relates to a method, system and program product for attaching a title key to encrypted content for synchronized transmission to a recipient. Specifically, a title key used to encrypt content is itself encrypted, and attached to the encrypted content so that both can be synchronously transmitted to a recipient.

2. Background Art

In the transmission of digital signals, content such as video and audio data is often transmitted from a signal source to a receiver. In transmitting such content, however, the security thereof must be ensured. In general, security of the content is provided by encrypting the content with a key, and then transmitting the encrypted content to the receiver. If compliant, the receiver is able to receive and decrypt the content. In securing the content in this manner, multiple keys can be used. For example, a first content packet might be encrypted with a first key, while a second content packet might be encrypted with a second key. The use of multiple keys provides enhanced security by preventing an entire content stream from being accessed with a single key. In such a scenario, however, it is essential for synchronization between the encrypted content and the corresponding keys to be maintained. That is, the receiver must be able to match content with the correct key. If matching is not maintained, the incorrect key might be used and the content could not be decrypted.

Current technologies that utilize key-based security practices include a personal computer-based Digital Rights Management System (DRMS) and a Conditional Access System (CAS). In the case of the former, content is packaged and loaded onto a web server. The keys used to encrypt/decrypt the content are downloaded to the personal computer, but not as an integral part of the content. Rather, either at download or rendering time, the receiver must access a license server to receive permission to access the content and a description of any corresponding usage rules.

In a television-based CAS, the content and keys are prepared at a head-end server based on the appropriate subscriber information. The encrypted content and keys are delivered in a multiplexed stream as separate data entities that must be synchronized with each other through various bit flags. At rendering time, the receiver will generally use a local smart card processor to receive permission to access the content so that no direct communication with the server is required. Thus, the CAS relies on bit flags to synchronize the keys to the encrypted content. Moreover, the CAS generally utilizes alternating keys (referred to as even and odd). That is, de-scrambling the content starts with the receipt of a key pair. The first key (e.g., the even) is used for a predetermined period to decrypt the content, after time which the second key is used. Once the second key starts being used, a new key pair can be sent to the receiver. In sending separate key sets to the receiver in this manner, however, loss of synchronization between the content and the keys is risked. Moreover, both DRMS and CAS can have inherent latencies in providing random access of protected content.

In view of the foregoing, there exists a need for a method, system and program product for attaching a key to encrypted content for synchronized transmission to, or storage by, a receiver. That is, a need exists for a key used to encrypt content to be itself encrypted, and transmitted as an integral part of the content. By transmitting the encrypted key as an integral part of the encrypted content, a receiver would receive the encrypted content as well as all information necessary to decrypt the content in a single stream. Moreover, by transmitting the encrypted key and encrypted content as a single stream, compatibility and compliance with existing front-end and back-end standards would be maintained. In addition, synchronous transmission to (and storage by) a receiver fosters random access to the content.

SUMMARY OF THE INVENTION

In general, the present invention provides a method, system and program product for attaching a title key to encrypted content for synchronized transmission to a recipient. Specifically, under the present invention, a content unit including a content packet and a header is received and parsed. A title key is then used to encrypt the content packet. Once the content packet is encrypted, the title key is itself encrypted with a key encrypting key. The encrypted title key is then attached to the content packet and the header for synchronized transmission to, or storage by a receiver.

According to a first aspect of the present invention, a method for attaching a title key to encrypted content for synchronized transmission to a recipient is provided. The method comprises the steps of: (1) encrypting content with a title key; (2) encrypting the title key with a key encrypting key; and (3) attaching the encrypted title key to the encrypted content for synchronized transmission to a recipient.

According to a second aspect of the present invention, a method for attaching a title key to encrypted content for synchronized transmission to a recipient is provided. The method comprises the steps of: (1) providing a content unit that includes a content packet and a header; (2) encrypting the content packet with a title key; (3) encrypting the title key with a key encrypting key; (4) attaching a header extension that includes the encrypted title key to the encrypted content packet; and (5) synchronously transmitting the header, the header extension and the encrypted content to a recipient.

According to a third aspect of the present invention, a system for attaching a title key to encrypted content for synchronized transmission to a recipient is provided. The system comprises: (1) a system for encrypting a content packet with a title key; (2) a system for encrypting the title key with a key encrypting key; and (3) a system for attaching a header extension that includes the encrypted title key to the encrypted content packet.

According to a fourth aspect of the present invention, a program product stored on a recordable medium for attaching a title key to encrypted content for synchronized transmission to a recipient is provided. When executed, the program product comprises: (1) program code for encrypting a content packet with a title key; (2) program code for encrypting the title key with a key encrypting key; (3) program code for attaching a header extension that includes the encrypted title key to the encrypted content packet.

Therefore, the present invention provides a method, system and program product for attaching a title key to encrypted content for synchronized transmission to a recipient.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a flow diagram of content usage conditions being combined with a title key and the combination being encrypted with a key encrypting key.

FIG. 6 depicts a flow diagram of the title key of FIG. 5 being recovered by a recipient.

Figure 1:
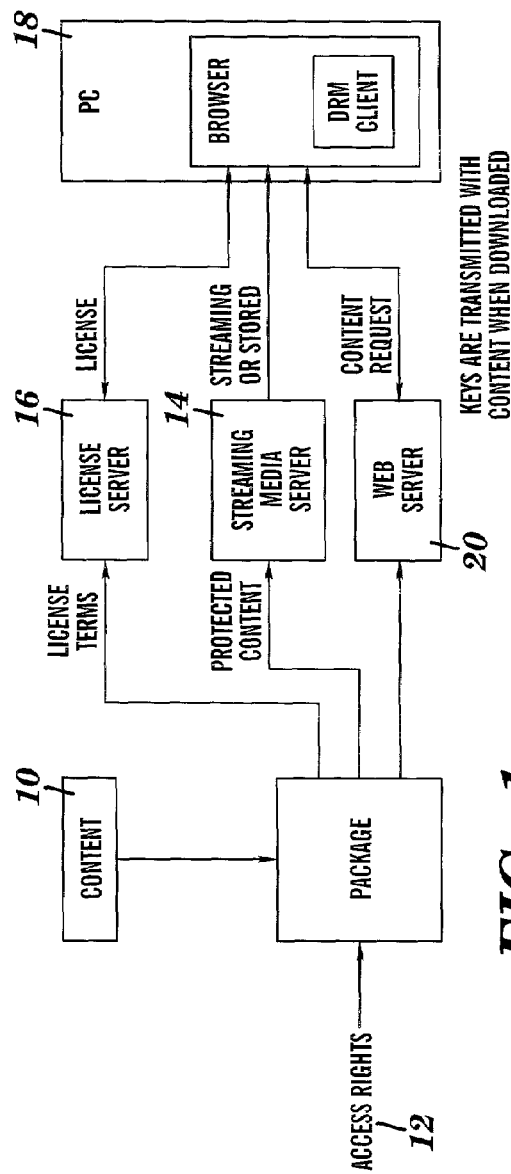
FIG. 1 depicts a flow diagram of a Digital Rights Management System (DRMS).

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For clarity, the Detailed Description of the Invention will have the following sections:

I. Definitions; and

II. Detailed Description.

I. Definitions

As used herein, the following terms shall have the following definitions:

Content—any data such as digital image, sound or binary data deliverable from a source to a recipient.

Content Owner—an entity, such as a movie studio, that owns content.

Content Service Provider—an entity, such as a cable service provider, that provides the "pipeline" through which content is delivered from a content owner to a consumer.

Receiver—a consumer device, such as a set-top box, a DVD player, etc., that receives content directly from a content owner, from a content service or from another receiver within a consumer home network.

Recipient—any entity, such as a content service provider or a receiver, capable of receiving transmissions.

Source—any entity, such as a content owner, a content service provider or a receiver (in a consumer home network), capable of sending transmissions.

Title Key—a key used to encrypt content.

Content Usage Conditions—guidelines such as copy controls, etc., governing the use and/or exploitation of content.

Key Encrypting Key—a key that is used to encrypt a title key or a title key—content usage condition combination.

Key Management Block (KMB)—a data structure containing multiple encryptions of a key encrypting key, and that excludes non-compliant devices. A KMB is also referred to in the art as a session key block, a media key block, a key media block and/or a management key block.

II. Detailed Description

The present invention provides a method, system and program product for inherently synchronizing transmission or storage of a title key (encrypted) with encrypted content. Specifically, under the present invention, content is encrypted with a title key. The title key is then encrypted with a key encrypting key and attached to the encrypted content as a header extension. This attachment allows the title key and the encrypted content to be synchronously transmitted to, or stored by, a recipient. Previous systems failed to provide such synchronized transmission. Moreover, by synchronously transmitting the title key with the encrypted content, the present invention maintains compatibility and compliance with current front-end and back-end standards.

Referring now to FIG. 1, a depiction of a Digital Rights Management System (DRMS) is shown. As depicted, content 10 is packaged with access rights/content usage conditions 12 and loaded onto media server 14. The keys used to access the content are downloaded to PC 18 as a separate component from the content. Specifically, either at download or at rendering time, license server 16 must be accessed to receive permission to access the content and a description of any corresponding usage conditions. Web server 20 provides the web pages that walk the customer through the steps to access the content on media server 14.

As shown, the content can be delivered through streaming delivery (e.g., if the file is large).

As indicated above, the DRMS fails to provide synchronized delivery of the content with the keys used to encrypt the content. That is, license server 16 must be separately accessed. When providing the keys in such a manner, there exists a likelihood that either the appropriate keys will not be matched with the encrypted content, or a single key will be used, weakening the security. Furthermore, providing keys from license server 16 requires a back channel.

Figure 2:
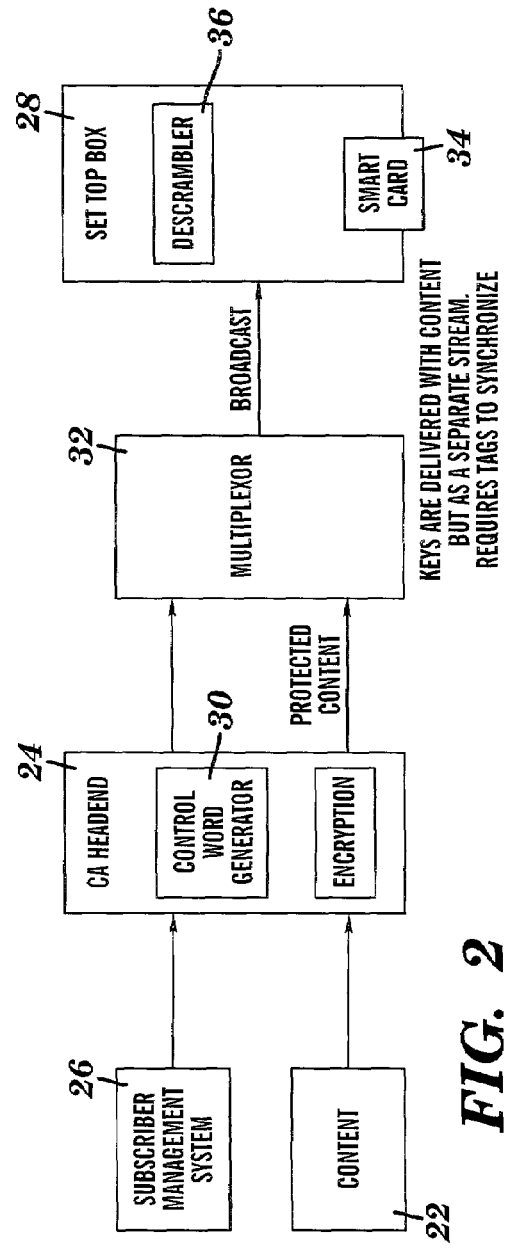
FIG. 2 depicts a flow diagram of a Conditional Access System (CAS).

Referring now to FIG. 2, a Conditional Access System (CAS), such as a cable or satellite television system, is shown in greater detail. In a CAS, two entitlement messages are delivered to receiver 28 (e.g., a set-top box). The first message is known as an entitlement management message that lists the services (e.g., what channels) a subscriber is authorized to access. The entitlement management message is delivered to receiver 28 less frequently than the second entitlement message, which is known as an entitlement control message. The entitlement control message is frequently delivered to receiver 28 and contains control words that can be converted into a key by smart card 34. Upon receiving encrypted content, if the entitlement management message indicates that a subscriber is authorized to access a certain channel, the control words in the entitlement control message will be converted into a key that is passed to descrambler 36. The key is then used by descrambler 36 to decrypt the content. Thus, similar to the DRMS, the CAS also fails to provide synchronized delivery of keys with encrypted content. More specifically, as depicted in FIG. 2, content 22 is provided to a head-end server 24 and encrypted using a key. The key is based on control words, which are generated via control word generator 30. The control words are typically based on subscriber information 26 that indicates subscriber authorization. The encrypted content and an entitlement control message (containing the control words) are multiplexed via multiplexor 32 and delivered to receiver 28 as separate data entities. The separate data entities must be synchronized with each other through various bit flags. At rendering time, receiver 28 uses smart card 34 to process the control words to arrive at a key. Descrambler 36 will then use the key to decrypt the content. Similar to the DRMS, the CAS fails to provide synchronized delivery of a key with encrypted content. Moreover, because delivery of keys and protected content are non-synchronized in a CAS, certain latencies such as delays are inherent in attempting to gain random access to the content.

Figure 3:
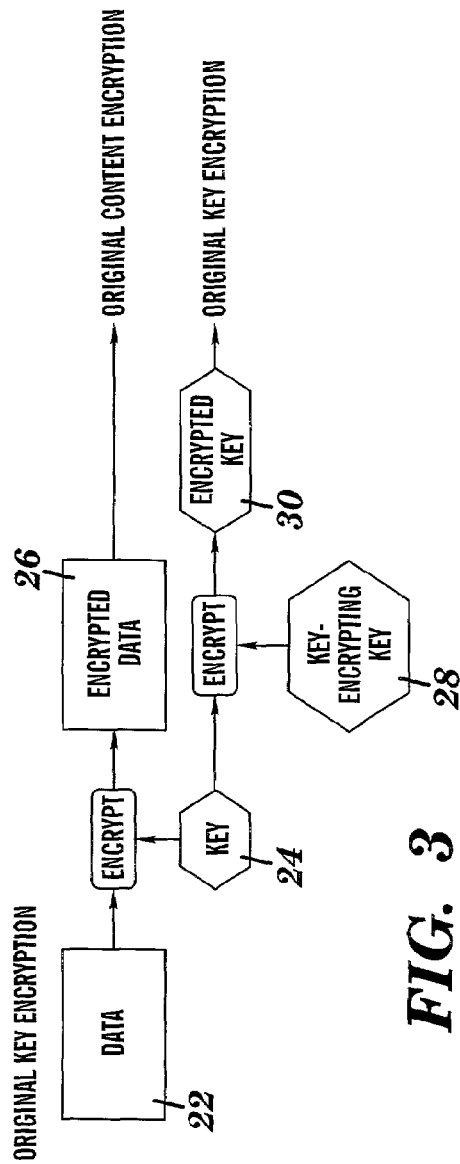
FIG. 3 depicts a flow diagram of a title key being encrypted with a key encrypting key.

Referring to FIG. 3, the encryption of content 22 using title key 24 is depicted in greater detail. As shown, content 22 is encrypted with title key 24 to yield encrypted content 26. Then, title key 24 is itself encrypted with key encrypting key 28. The encrypted title key 30 can then be transmitted along with the encrypted content 26 to a recipient.

Figure 4:
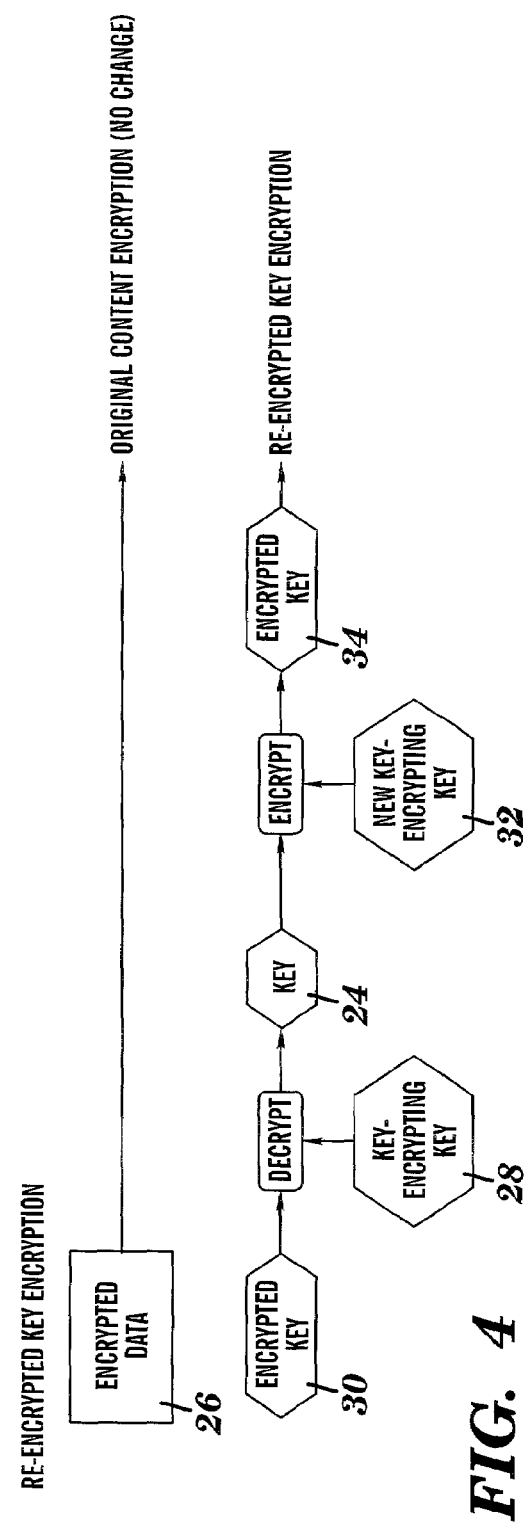
FIG. 4 depicts a flow diagram of the title key of FIG. 3 being decrypted and re-encrypted with a different key encrypting key.

FIG. 4 demonstrates that an encrypted title key 30 can be re-encrypted with a different key encrypting key 32 without having to re-encrypt the encrypted content 26. As shown, encrypted key 30 is received and decrypted with key encrypting key 28. Title key 24 is then re-encrypted with a new key encrypting key 32. The re-encrypted title key 34 is then transmitted along with the undisturbed encrypted content 26. By re-encrypting title key 24, the protection on the content can be varied without having to re-encrypt the content itself, which could be significantly more time-consuming and/or consume more resources than re-encrypting title key 24.

It should be understood that key encrypting key 28 is generally determined based on a key management block (KMB), which is typically delivered to a recipient concurrently with or prior to the delivery of encrypted content 26 (as will be further described below). Specifically, as defined above, a KMB is a data structure that contains multiple encryptions of key encrypting key 28 that is recoverable by compliant recipients. When encrypted content is received, the recipient will use previously provided keys (e.g., device keys, content owner keys, service provider keys, etc.) to process the KMB and recover key encrypting key 28. For example, if the content is received by a DVD player, internal device keys within the DVD player will be used to decrypt one of the encryptions of key encrypting key 28 in KMB. Once recovered, key encrypting key 28 will be used to recover title key 24, which will be used to decrypt the content. If, however, the DVD player was a known non-compliant or circumvention device, its internal device keys would be unable to recover the correct key encrypting key 28, because the KMB would have been modified to exclude the device. Thus, the correct title key could not be recovered and the content could not be decrypted. As such, key encrypting keys are inherently more secure than title keys, and do not need to be changed as frequently.

As indicated above, because the KMB is necessary to access encrypted content, the KMB should be delivered synchronously with, or prior to, the encrypted content. When this condition is not met, a delay could be incurred between when encrypted content is received and when it accessed (e.g., between when a channel is changed and when an image is displayed).

To facilitate the synchronized delivery of the KMB with the content, many techniques could be implemented. In one example, the KMBs can be contained in a separate stream. This allows for a time stamp or the like to be inserted so that the timing of the KMB is coordinated with the delivery of the content. Such a technique allows all information needed to access the content to be contained in a collection of streams that can be multiplexed in different manners, based on the system requirements.

To accommodate for minor differences in synchronization, a receiver may cache multiple KMBs (or the corresponding key encrypting keys) in memory. For example, two key encrypting keys may be cached. The first key would correspond to content that is currently being received while the second key would correspond to content that has yet to begin arriving. The second key would result from processing a KMB that was transmitted ahead of the encrypted content. To determine which of two, or more, key encrypting keys to use, multiple alternatives can be implemented. In a first alternative, a version number is included in a private data field in a header. In another alternative, a verifier can be used. In the case of the latter, however, more than one verification could be necessary if more than one key encrypting key is cached.

In any event, the present invention could also have the capability to avoid unnecessary processing of a KMB. Specifically, a KMB can be prepended with a hash prior to transmission to the receiver. Upon receipt of a KMB, the receiver would compare the corresponding hash against the hashes of KMBs already processed/cached so that only KMBs with a new hash are processed. Thus, an existing KMB would not have to be processed multiple times by the same receiver.

Referring now to FIG. 5, a flow diagram depicting the binding of content usage conditions 36 to title key 24 is shown. As depicted, content usage conditions 36 are provided (e.g., by a content source such as a content owner). The conditions 36 are then compressed into a digest 38 (e.g., a hash), which is combined with title key 24 (e.g., via an exclusive OR operation) to yield combination 40. The resulting combination 40 is then encrypted with key encrypting key 28 to yield an encrypted combination 42. Once encrypted, combination 42 can be transmitted to a recipient along with un-encrypted content usage conditions 36. It should be understood that encrypted combination 42 is considered to be a message authorization code (MAC). However, it should be further understood that many variations of MACs are known, and could be implemented under the present invention. For example, the MAC could be only digest 38 as encrypted with key encrypting key 28.

FIG. 6 depicts the transmission of FIG. 5 after receipt by a recipient (e.g., content service provider or consumer). As shown, the recipient receives encrypted combination 42 (i.e., the MAC) and content usage conditions 36 from the source. By processing a key management block (KMB) (e.g., with valid device keys), key encrypting key 28 is recovered. Once key encrypting key 28 has been determined, encrypted combination 42 can be decrypted. Then, using the received content usage conditions 36, digest 38 is re-created and title key 24 is recovered. Specifically, once digest 38 is re-created, the content usage conditions as digested in combination 40 will be "removed" (e.g., via an inverse exclusive OR operation) to yield title key 24. Once recovered, title key 24 is used to decrypt content. Thus, a recipient can receive and decrypt protected content and a digest of the usage conditions without having to hold two-way communications with the sender.

It should be understood that in addition to re-creating digest 38 to recover title key 24, digest 38 can be re-created to verify the integrity of content usage conditions 36. Specifically, if the usage conditions have been compromised, the re-created digest 38 will be different from the digest calculated at the source and the receiver will not be able to correctly calculate the title key 24.

Figure 7:
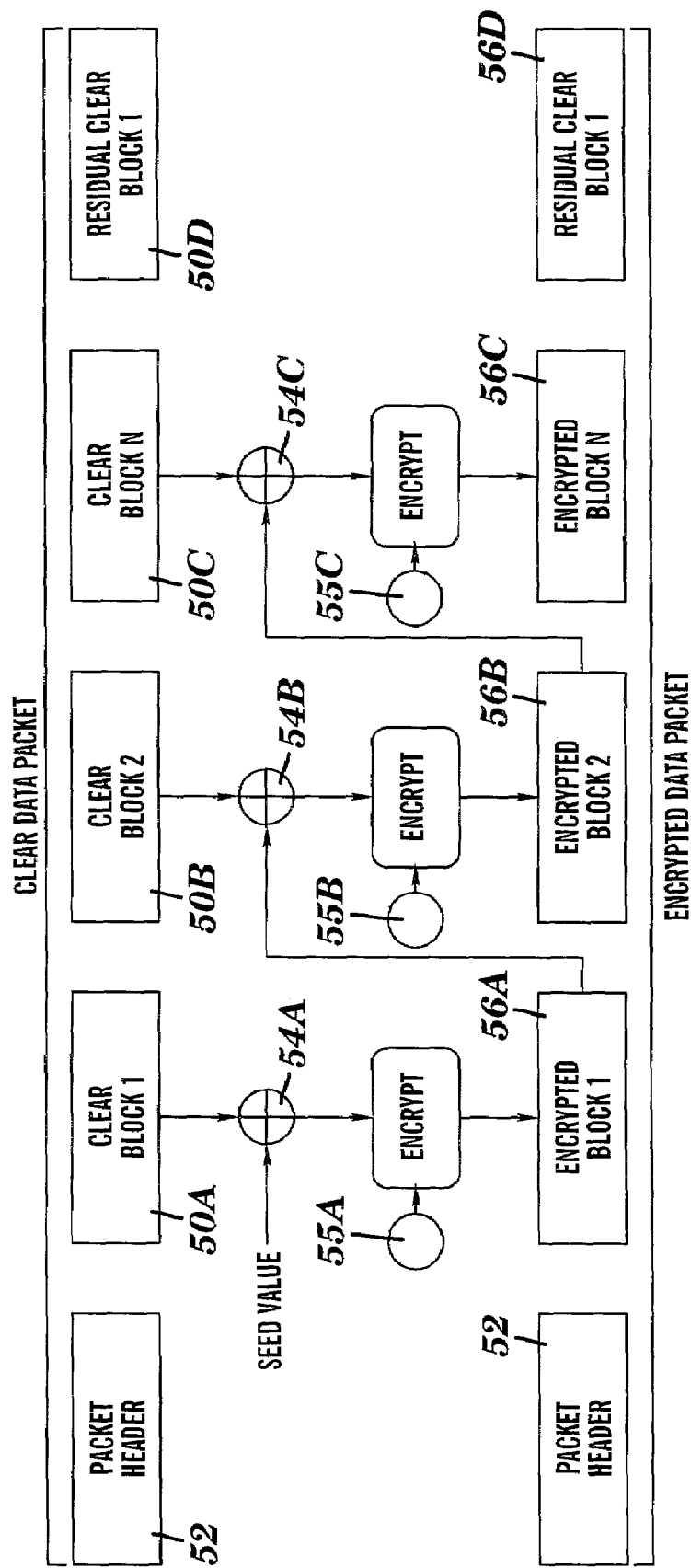
FIG. 7 depicts a flow diagram of a Cipher Block Chaining Mode.

Referring now to FIG. 7, a flow diagram of cipher block chaining mode is depicted. Under the cipher block chaining mode, a series of content blocks is separately encrypted for transmission to a recipient. Specifically, as shown, content is segmented into content blocks 50A-D, and is accompanied with content header 52. Content header 52 typically contains information such as a time stamp that allows the content to be identified. Once segmented, seed values 54A-C and key values 55A-C are utilized to encrypt content blocks 50A-C to yield encrypted content blocks 56A-C. Thereafter, encrypted content blocks 56A-C, header 52 and un-encrypted content block 56D can be transmitted to a recipient. Similar to the DRMS and CAS shown in FIGS. 1 and 2, however, the protected content is transmitted separately from the objects (i.e., key values) used to encrypt the content. Under such a scenario, errors and/or delays in decrypting content blocks 56A-C can occur. Moreover, when separately transmitting key values 55A-C, random access of content is not possible. Specifically, it is not possible to access a content stream from any content block.

Figure 8:
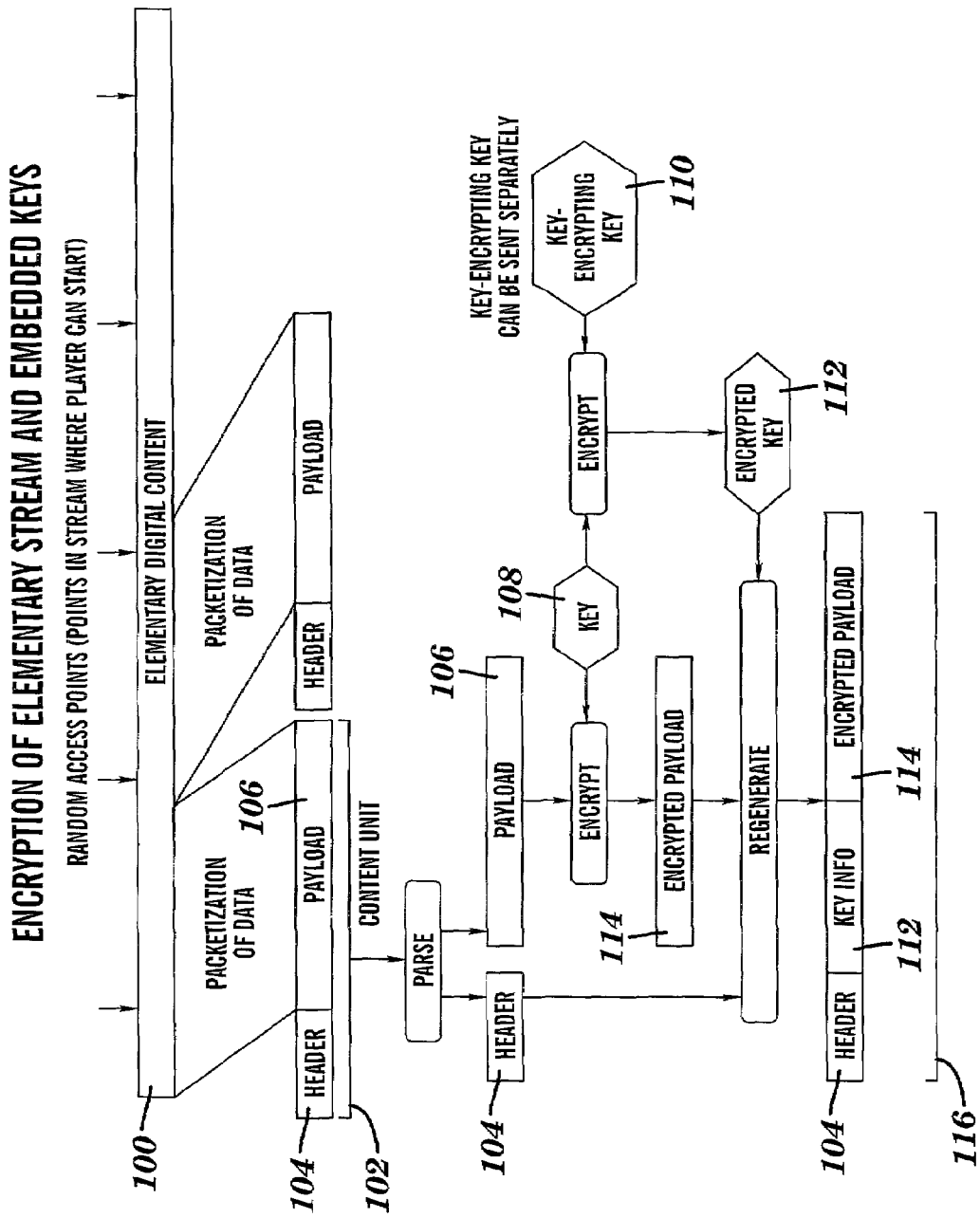
FIG. 8 depicts a flow diagram of an elementary content stream being processed according to the present invention.

Referring now to FIG. 8, the encryption and attachment of a title key to encrypted content under the present invention is shown. As depicted, an elementary content stream 100 comprising of compressed content is parceled into content units 102. Each content unit includes a header 104 and a content packet 106. Header 104 includes information helpful in identifying the content such as a time stamp, type of content: video, audio or other. Header 104 is especially useful, for example, in synchronizing sound data with video data. Once parceled, header 104 of each content unit 102 is parsed from content packet 106 and content packet 106 is encrypted with title key 108 to yield encrypted content packet 114. Then, key encrypting key 110 is used to encrypt title key 108, which is then attached to content packet 106 along with header 104. The resulting processed content unit 116 can then be transmitted to a recipient. That is, the encrypted content unit, the header and the header extension (including the encrypted title key) will be delivered to, or stored by, a recipient as a single, integral data stream. Thus, a recipient will receive or store encrypted content along will all information necessary to decrypt the content. This not only prevents the synchronization problems associated with previous systems, but also provides random access of content. As indicated above, both DRMS and CAS have inherent latencies (e.g., delays) in providing random access of content. Specifically, because each content packet transmitted under the present invention is "packaged" with the title key that was used to encrypt it, a recipient can access and decrypt the content stream at any packet.

It should be understood that the present invention is not limited to receiving an elementary content stream that must be parceled into content units. Rather, the teachings of the present invention can be applied to the scenario where the content is received as content units (e.g., pre-parceled). It should also be understood that FIG. 8 depicts the processing of only one content unit 102 for clarity purposes only, and that in a typical embodiment, multiple content units 102 will be processed in this manner. Moreover, it should be appreciated that when multiple content units 102 are processed, it is not necessary for the same title key to be used to encrypt each content packet. Rather, each content packet could be encrypted with a different title key. To this extent, the quantity of title keys used to encrypt an elementary content stream 100 is not problematic because each title key will be attached (e.g., in an encrypted form) to the corresponding encrypted content packet. Furthermore, although not shown, it should be appreciated that content usage conditions can be combined with the title key(s) prior to encryption, as shown and described in conjunction with FIGS. 5 and 6. In such a case, the encrypted combination of content usage conditions and the title key will be attached to the encrypted content as a header extension.

Figure 9:
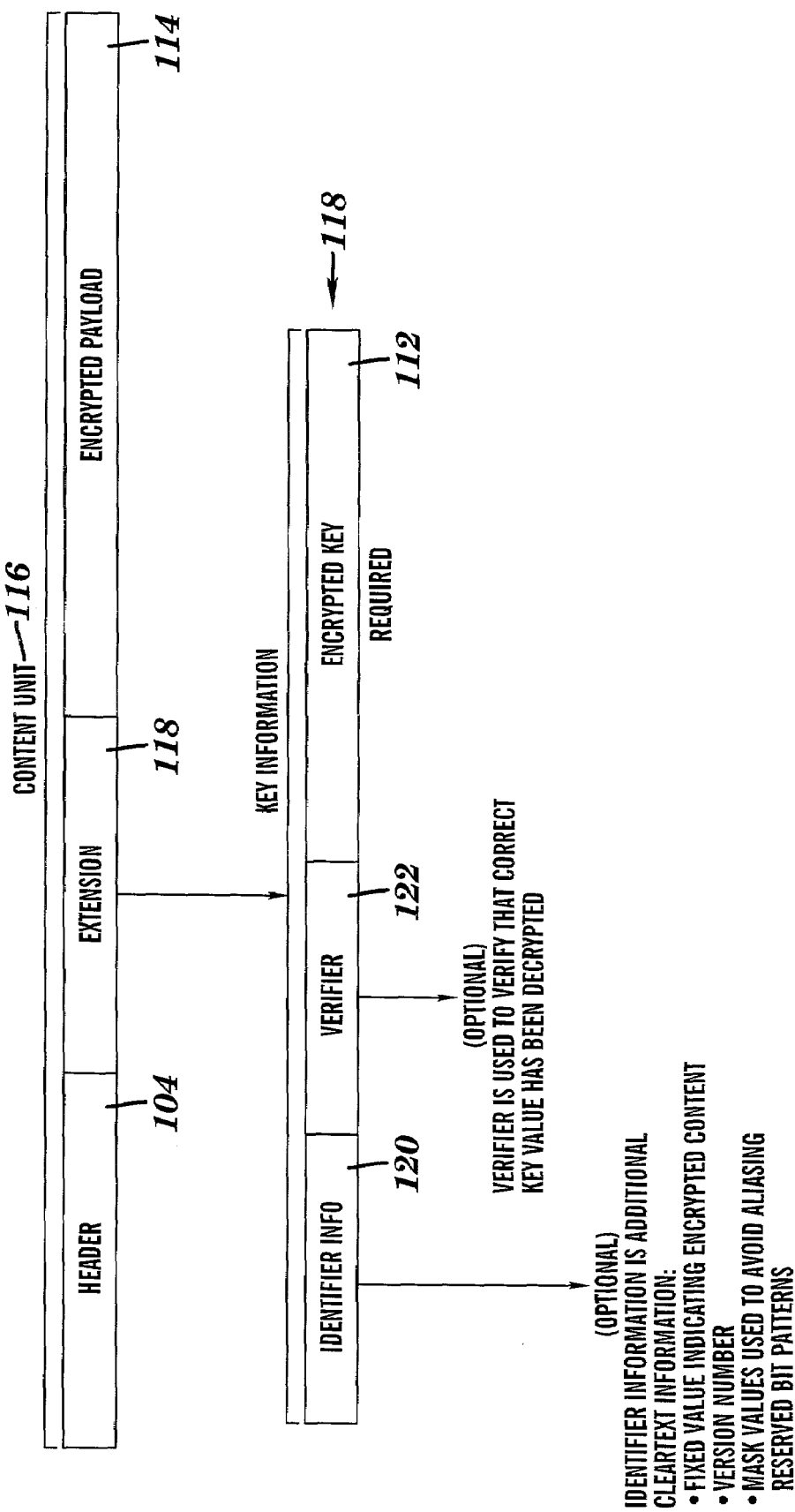
FIG. 9 depicts a header extension according to the present invention.

Referring now to FIG. 9, header extension 118 is shown in greater detail. As depicted, header extension 118 includes encrypted title key 112, optional identifier information 120 and optional verifier 122. Identifier information 120 is clear text information such as a fixed value indicating encrypted content, a version number and/or mask values used to avoid aliasing of reserved bit patterns. The mask values are used to prevent key information or other data in a header extension from aliasing a known code. Specifically, the mask values indicate to modify (e.g., invert) part or all of the key information so as to distinguish it from a known code that may have a specialized purpose. This avoids a possible erroneous code detection. Verifier 122, if used, is a value that allows a recipient to verify that the correct title key has been recovered.

Figure 10:
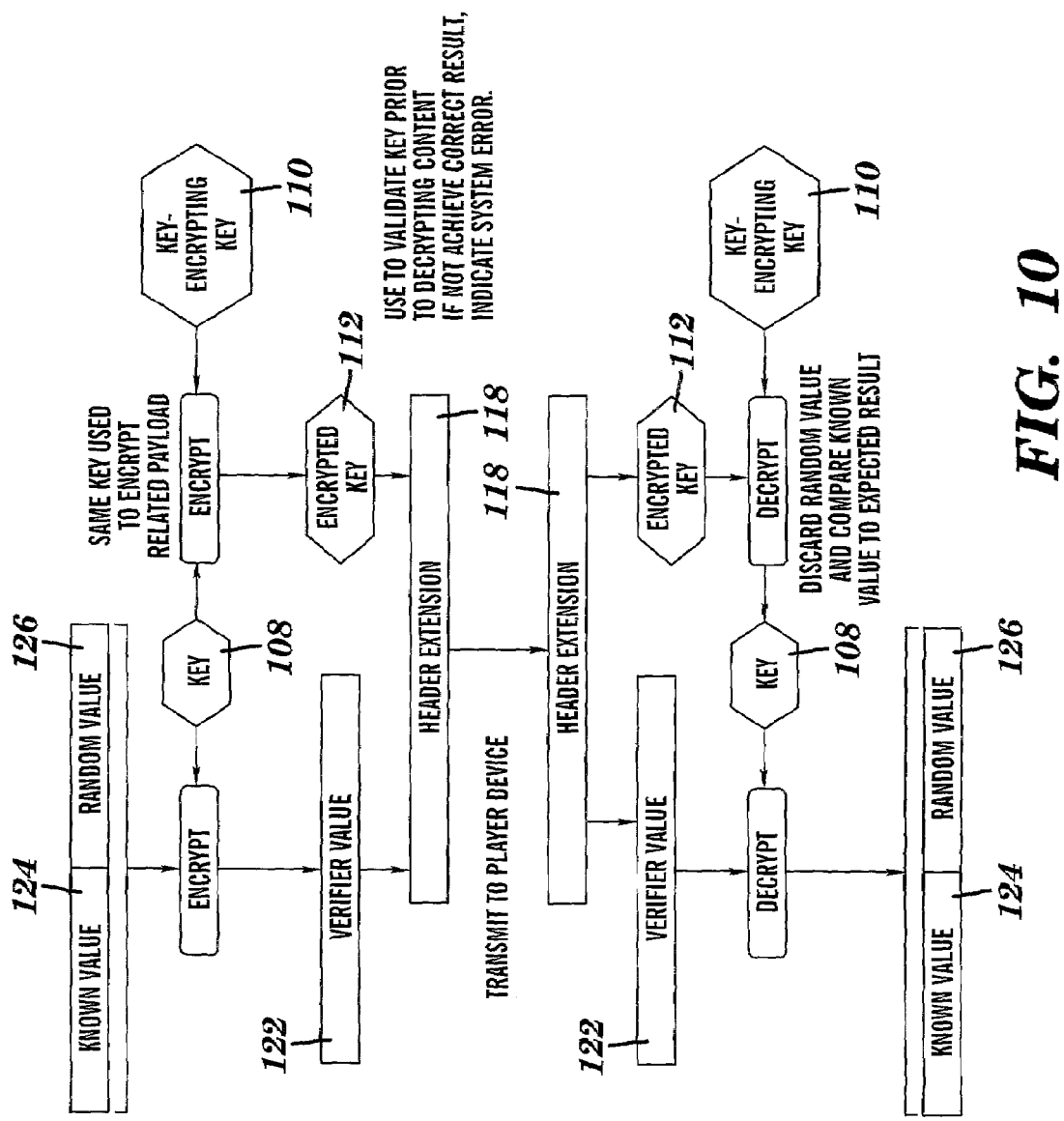
FIG. 10 depicts a first flow diagram of a verifier being implemented under the present invention.

FIG. 10 depicts a first embodiment of verifier 122. As shown, verifier 122 is based on a known value 124 and a random value 126, as encrypted with title key 108. Once values 124 and 126 are encrypted, title key 108 is encrypted with key encrypting key 110 to yield encrypted key 112, which is packaged with verifier 122 as header extension 118. Header extension 118 is then transmitted (e.g., attached to encrypted content packet) to a recipient. Once received, the recipient will separate verifier 122 from encrypted key 112. Then, using key encrypting key 110 (i.e., as recovered from KMB as described above), encrypted key 112 will be decrypted to yield title key 108. Title key 108 will then be used to decrypt verifier 122 to yield known value 124 and random value 126. Random value 126 is discarded leaving only known value 124. If known value 124 is correct, receiver has used the correct title key 108, which can now be used to decrypt the corresponding encrypted content packet. The use of a verifier thus provides a short way for title key 108 to be verified. Specifically, since verifier 122 is generally substantially shorter in bit size than encrypted content, it provides a quicker way to determine whether title key 108 is correct (as opposed to attempting to use title key 108 to decrypt the content, which could take considerably longer).

It should be understood that title key 108 used to encrypt verifier 122 should be the same title key that is used to encrypt the content packet to which header extension 118 is attached. Thus, as described above, title key 108 may change based on the content unit 102 (FIG. 8).

Figure 11:
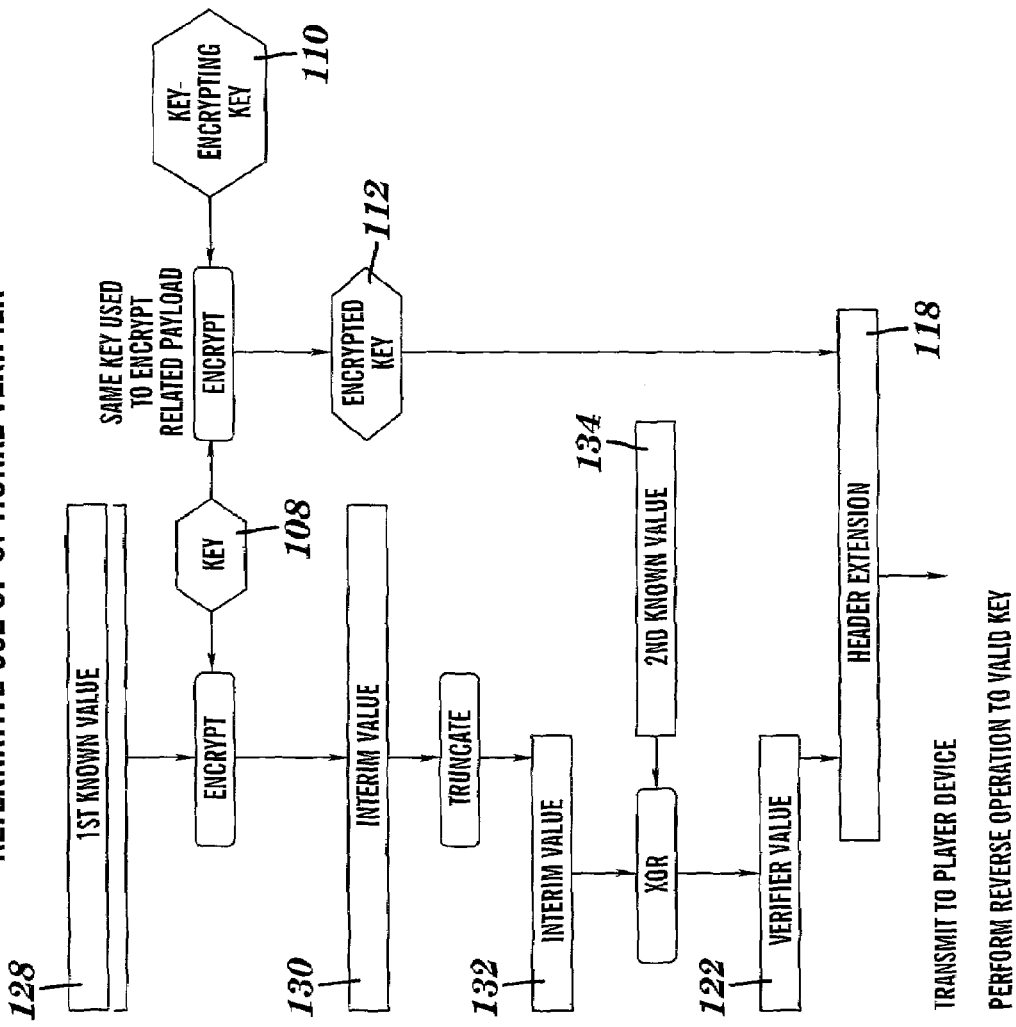
FIG. 11 depicts a second flow diagram of a verifier being implemented under the present invention.

Referring to FIG. 11, another embodiment of verifier 122 is shown. As depicted, a first known value 128 is encrypted with title key 108 to yield interim value 130. Similar to FIG. 10, title key 108 is then encrypted with key encrypting key 110 to yield encrypted key 112. Interim value 130 is truncated to yield truncated value 132, which is combined with a second known value 134 (e.g., via a XOR operation) to yield verifier 122. Verifier 122 is then packaged with encrypted key 112 in header extension 118, and attached to a content packet for transmission to a recipient. The recipient will then perform the steps in reverse. Specifically, the recipient will separate header extension 118 from the content packet and recover encrypted key 112 from header extension 118. Then, an inverse XOR operation will be performed to separate the second known value 134 from truncated value 132. Truncated value 132 will be expanded to yield interim value 130. Using key encrypting key 110 (as recovered from a KMB) to process encrypted key 112, title key 108 will be recovered and used to decrypt interim value 130. If first known value 128 was recovered, the correct title key 108 was recovered, which can now be used to decrypt the corresponding content packet.

Figure 12:
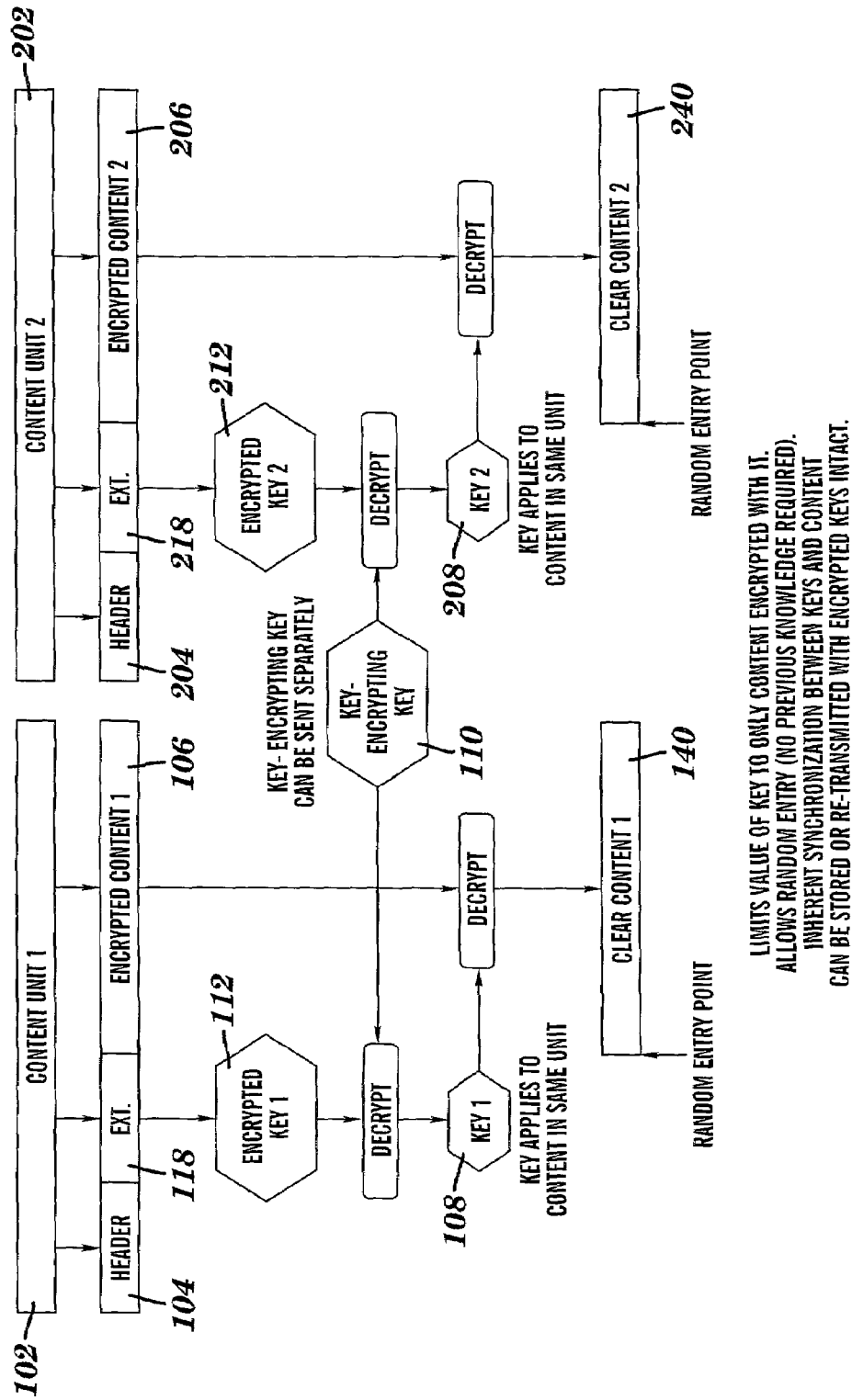
FIG. 12 depicts a flow diagram of content packets being processed by a recipient, according to the present invention.

Referring now to FIG. 12, the receipt and processing of content units 102 and 202 under the present invention are shown in greater detail. As depicted, content units 102 and 202, including headers 104 and 204, header extensions 118 and 218 and content packets 106 and 206 are received. Encrypted keys 112 and 212 are recovered from header extensions 118 and 218, respectively. Key encrypting key 110 is then used to decrypt both encrypted keys 112 and 212 to yield title keys 108 and 208. Once recovered, title keys 108 and 208 are used to decrypt the corresponding content packets 106 and 206 to yield content 140 and 240.

Because the title keys 108 and 208 are attached and transmitted with the content packets they were used to encrypt, synchronization under the present invention is inherent. In contrast, related systems generally rely on separate transmissions and/or bit flags for synchronization. Moreover, synchronized transmission and delivery of title keys with encrypted content allows random access of the content. Specifically, because each content packet is accompanied with the correct title key, the content stream can be accessed at any packet. Related systems fail to provide such a feature. In addition, because each content packet can be encrypted with a different title key, a party who illicitly obtains a title key cannot access the entire stream. In contrast, the pirated key is only good for decrypting the content packet to which is was attached. Also, because the title key and encrypted content are transmitted as a single stream, the present invention is compatible and compliant with current front-end and back-end standards.

Figure 13:
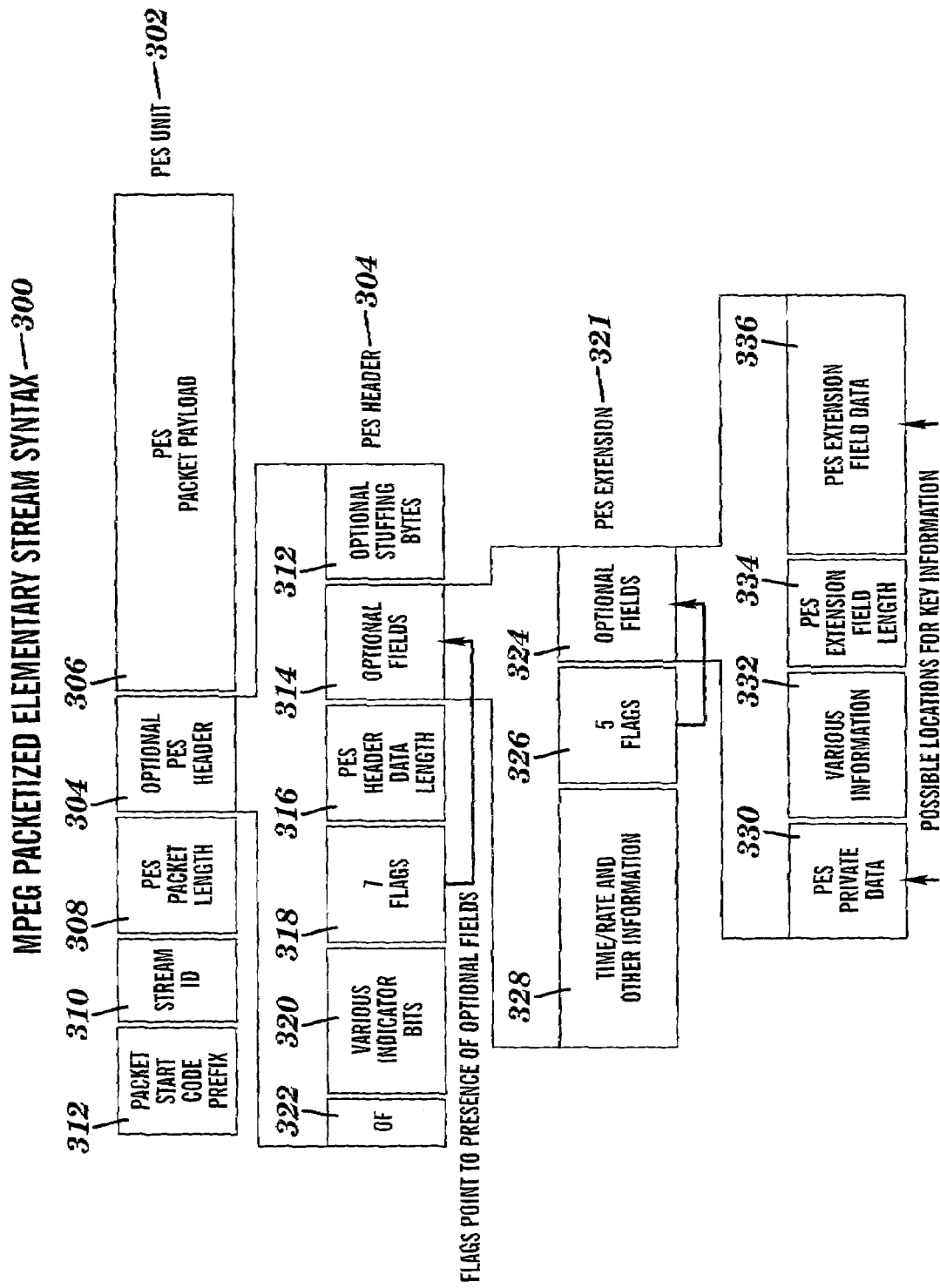
FIG. 13 depicts a MPEG implementation of the present invention.

Referring now to FIG. 13, an exemplary MPEG embodiment of the present invention is depicted. As shown, a MPEG packetized elementary stream 300 is parceled into PES (packet) units 302 (only one shown for clarity purposes). PES unit 302 includes packetized elementary stream (PES) packet payload 306, optional PES header 304, packet length 308, stream identification 310 and start code prefix 312. PES packet payload 306 will be encrypted with a title key, which will then be encrypted with a key encrypting key and embedded in PES unit 302 as header extension 321. As depicted, optional PES header 304 includes optional stuffing bytes 312, optional field 314, PES header data length 316, flags 318, indicator bits 320 and fixed numeric value 322. Flags indicate the presence of optional field 314. Header extension 321 is shown in optional field 314 and includes optional field 324, flags 326 and time/rate (or other) information 328. Within optional field 324 is PES private data 330, additional information 332, PES extension field length 334 and PES extension field data 336. The encrypted title key can be included as PES extension field data 336 or as PES private data 330.

Figure 14:
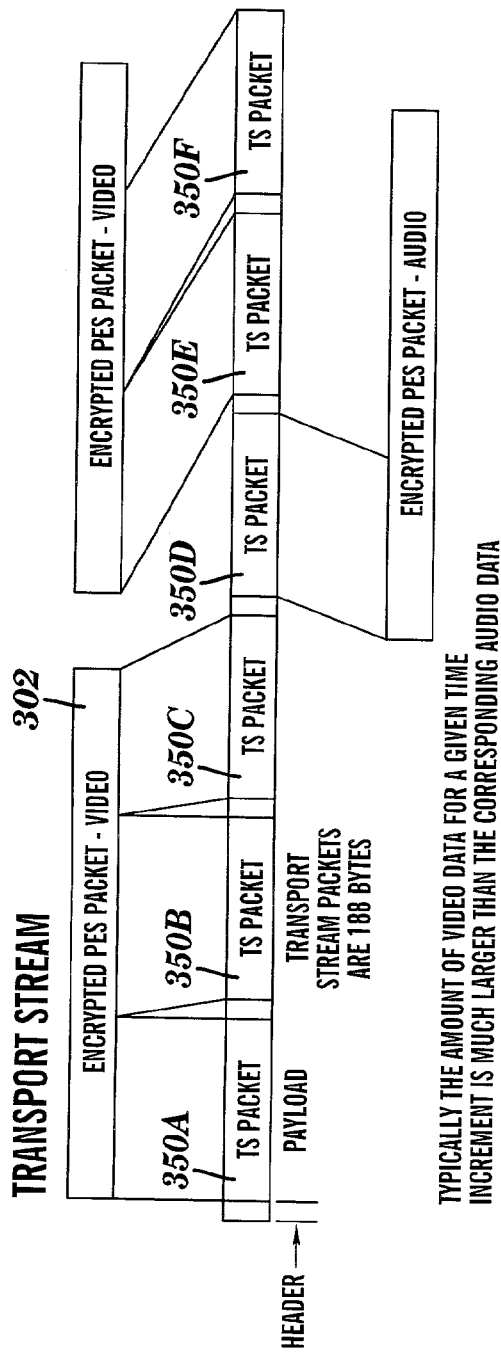
FIG. 14 depicts the multiplexing of PES units by a transport stream system.
Figure 15:
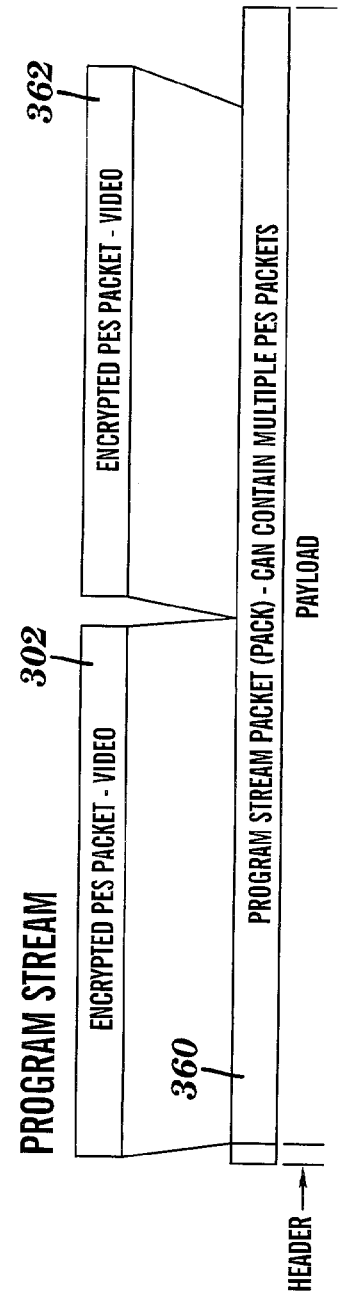
FIG. 15 depicts the multiplexing of PES units by a program stream system.

Once the encrypted key (and any optional identifier information and/or verifier) has been attached to PES packet 306, the resulting PES unit 302 can then be multiplexed in two different system options. The first is shown in FIG. 14 and is known as a transport stream. A transport stream is typically used in error-prone broadcast environments such as digital television. As depicted, transport stream packets 350A-F are relatively small, and it generally takes multiple transport stream packets 350A-C to contain a single video PES unit 302. The second option is a program stream, which is shown in FIG. 15. A program stream is generally used in more reliable transmissions such as those with error correcting codes or in fixed storage. Unlike transport stream packets, however, a single program stream packet 360 can hold multiple video PES units 302 and 362.

It should be understood that the elements of FIGS. 1-15 used to receive/transmit transmissions, encrypt/decrypt content and/or keys, attach keys to content etc. can be implemented as hardware, software or as a combination of hardware or software. As such, any kind of computer/server system(s)—or other apparatus adapted for carrying out the methods described herein—is suited. A typical combination of hardware and software could be a general purpose (computer) system with a computer program that, when loaded and executed, carries out the methods described herein. Alternatively, a specific use (computer) system, containing specialized hardware for carrying out one or more of the functional tasks of the invention could be utilized. The present invention can also be embedded in a computer program product, which comprises all the features enabling the implementation of the methods described herein, and which—when loaded in a (computer) system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 16:
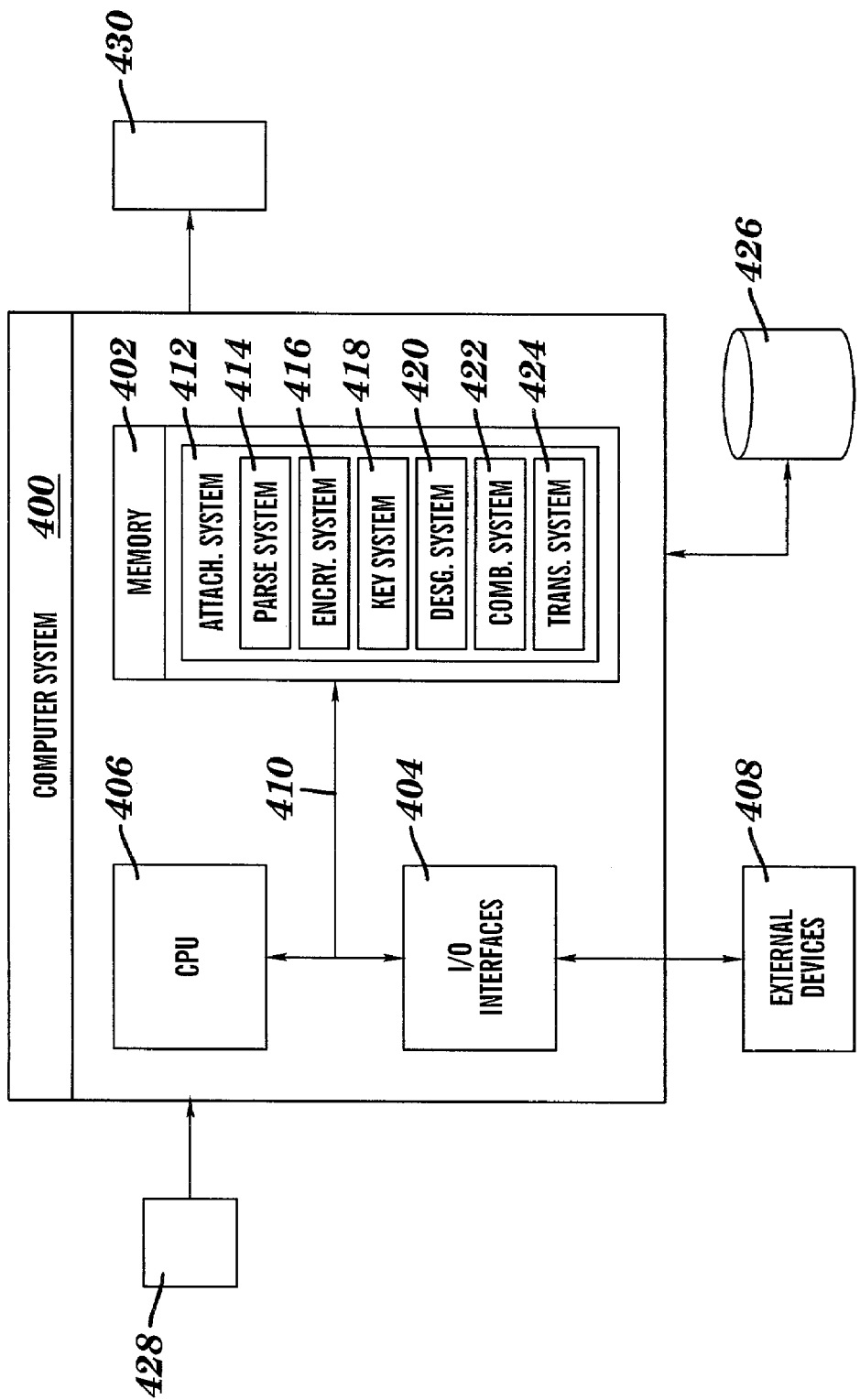
FIG. 16 depicts a computer system having an attachment system, according to the present invention.

Referring now to FIG. 16, an exemplary computerized implementation of the present invention is shown. As depicted, computer system 400 generally comprises memory 402, input/output (I/O) interfaces 404, a central processing unit (CPU) 406, external devices/resources 408, bus 410 and database 426. Memory 402 may comprise any known type of data storage and/or transmission media, including magnetic media, optical media, random access memory (RAM), read-only memory (ROM), a data cache, a data object, etc. Moreover, memory 402 may reside at a single physical location, comprising one or more types of data storage, or be distributed across a plurality of physical systems in various forms. CPU 406 may likewise comprise a single processing unit, or be distributed across one or more processing units in one or more locations, e.g., on a client and server.

I/O interfaces 404 may comprise any system for exchanging information from an external source. External devices 408 may comprise any known type of external device, including speakers, a CRT, LED screen, hand-held device, keyboard, mouse, voice recognition system, speech output system, printer, monitor, facsimile, pager, etc. Bus 410 provides a communication link between each of the components in the computer system 400 and likewise may comprise any known type of transmission link, including electrical, optical, wireless, etc. In addition, although not shown, additional components, such as cache memory, communication systems, system software, etc., may be incorporated into computer system 400.

Database 426 may provide storage for information necessary to carry out the present invention such as a KMB, content usage conditions, a verifier, identifier information, etc. As such, database 426 may include one or more storage devices, such as a magnetic disk drive or an optical disk drive. In another embodiment, database 426 includes data distributed across, for example, a local area network (LAN), wide area network (WAN) or a storage area network (SAN) (not shown). Database 426 may also be configured in such a way that one of ordinary skill in the art may interpret it to include one or more storage devices.

It should be understood that computer system 400 is intended to be representative of any system capable of processing content units of an elementary content stream received from source 428, and transmitting the processed content units to a recipient 430. Stored in memory 402 is attachment system 412, which includes parsing system 414, encryption system 416, key system 418, designation system 420, combination system 422 and transmission system 424.

As described above, an elementary content stream having content units that each include a header and a content packet is received from source 428. Upon receipt, parsing system 414 will parse or separate the header from the content packet. Once parsed, encryption system 416 will use title key to encrypt the content packet. Key system 418 will then use the key encrypting key (e.g., as encrypted in KMB) to encrypt the title key for attachment to the encrypted content packet as a header extension. Designation system 420 allows content usage conditions, identifier information and/or a verifier (collectively referred to as "data") to be optionally designated. If designated, the data will be combined with the encrypted key in the header extension via combination system 422. In any event, the encrypted content packet, the header and the header extension will be combined into a single processed content unit by combination system 422 and synchronously transmitted to recipient 430 via transmission system 424. Once received, recipient 430 can then synchronously store the encrypted content and attached title key.

It should be understood that the various systems depicted in FIG. 16 are intended to be exemplary only. For example, attachment system 412 could include a parceling system for receiving an elementary content stream (as opposed to content units) and parceling the same into content units.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for attaching a title key to encrypted content for synchronized transmission to a recipient, comprising the steps of:
   encrypting content key with the title key;
   encrypting the title key with a key encrypting key;
   attaching the encrypted title key to the encrypted content for synchronized transmission to a recipient; and
   attaching identifier information and a verifier to the encrypted content, wherein the identifier information prevents aliasing of reserved bit patterns.

2. The method of claim 1, farther comprising the step of synchronously transmitting the encrypted content and the attached encrypted title key to a recipient.

3. The method of claim 1, farther comprising the steps of:
   receiving an elementary content stream; and
   parceling the elementary content stream into content units, prior to encrypting the content, wherein each content unit includes content and a header.

4. The method of claim 3, farther comprising the step of parsing the headers from the content, prior to encrypting the content.

5. The method of claim 1, wherein the verifier comprises a known value encrypted with the title key.

6. A program product stored on a recordable medium which when executed causes attachment of a title key to encrypted content for synchronized transmission to a recipient, the computer program product comprising:
   program code for encrypting a content packet with the title key;
   program code for encrypting the title key with a key encrypting key; and
   program code for attaching a header extension that includes the encrypted title key to the encrypted content packet,
   wherein the header extension further includes identifier information and a verifier, and wherein the verifier comprises a known value encrypted with the title key, and
   wherein the identifier information comprises mask values that prevents aliasing reserved bit patterns.

7. The program product of claim 6, further comprising program code for synchronously transmitting the header extension and the encrypted content to a recipient.

* * * * *